United States Patent [19]

Gilchrist, Jr.

[11] Patent Number: 5,951,812
[45] Date of Patent: Sep. 14, 1999

[54] JOINING MEMBER AND METHOD OF JOINING TWO CONDUCTIVE PIECES OF FIBERGLASS REINFORCED PLASTIC PIPE

[75] Inventor: James L. Gilchrist, Jr., N. Little Rock, Ark.

[73] Assignee: A. O. Smith Corporation, Milwaukee, Wis.

[21] Appl. No.: 08/862,715

[22] Filed: May 23, 1997

[51] Int. Cl.$^6$ ................................................. B29C 65/00
[52] U.S. Cl. ................................. 156/304.2; 156/304.3; 174/47
[58] Field of Search ................................. 156/157, 158, 156/304.1, 304.2, 304.3; 174/47, 84 R, 84 S, 88 C

[56] References Cited

U.S. PATENT DOCUMENTS

| 202,392 | 4/1878 | Work | 200/51 R |
|---|---|---|---|
| 2,966,539 | 12/1960 | Sears et al. | 174/47 |
| 3,249,685 | 5/1966 | Heflin, Jr. | 174/84 |
| 3,277,233 | 10/1966 | Houck et al. | 174/78 |
| 3,860,742 | 1/1975 | Medney | 174/84 |
| 3,943,273 | 3/1976 | de Putter | 174/84 |
| 4,012,670 | 3/1977 | Shaw | 361/117 |
| 4,032,708 | 6/1977 | Medney | 174/84 |
| 4,120,325 | 10/1978 | De Putter | 138/145 |
| 4,330,811 | 5/1982 | Bordner | 361/212 |
| 4,577,664 | 3/1986 | Takahashi et al. | 138/149 |
| 4,633,363 | 12/1986 | Bordner | 361/215 |
| 4,659,870 | 4/1987 | Jones | 174/84 |
| 5,334,801 | 8/1994 | Mohn | 174/47 |
| 5,378,991 | 1/1995 | Anderson et al. | 324/557 |

*Primary Examiner*—James Sells
*Attorney, Agent, or Firm*—Michael Best & Friedrich LLP

[57] ABSTRACT

This invention provides a method of joining two pieces of fiberglass reinforced pipe, the pipe having a pipe wall and including means for conducting electricity through the pipe from one end to the other end, and a joining member. The joining member includes a cylinder having a wall and including a first end adapted to receive one of the pipe pieces and a second end adapted to receive the other of the pipe pieces. The joining member also includes an inner ring integral with the cylinder wall, the ring extending radially inwardly from the cylinder wall a distance equal to about the width of the pipe wall. The inner ring also has a first side facing the first cylinder end and a second side facing the second cylinder end. The method comprises placing the one pipe piece inside the joining member first end and then the other pipe piece inside the joining member second end so a conductive adhesive is between the joining member cylinder wall, the first ring side and the second ring side and the pipe pieces so that the adhesive is between the joining member and the one pipe piece and the other pipe piece and conducts electricity from one pipe piece to the other pipe piece, and the two pieces of pipe each include an inside conductive surface and an outside conductive surface, and the conductive adhesive extends along the ring first and second sides between the inside and the outside pipe conductive surfaces and contacts the inside and the outside conductive surfaces so that static charge on the inside pipe surface can pass to the outside pipe surface.

14 Claims, 2 Drawing Sheets

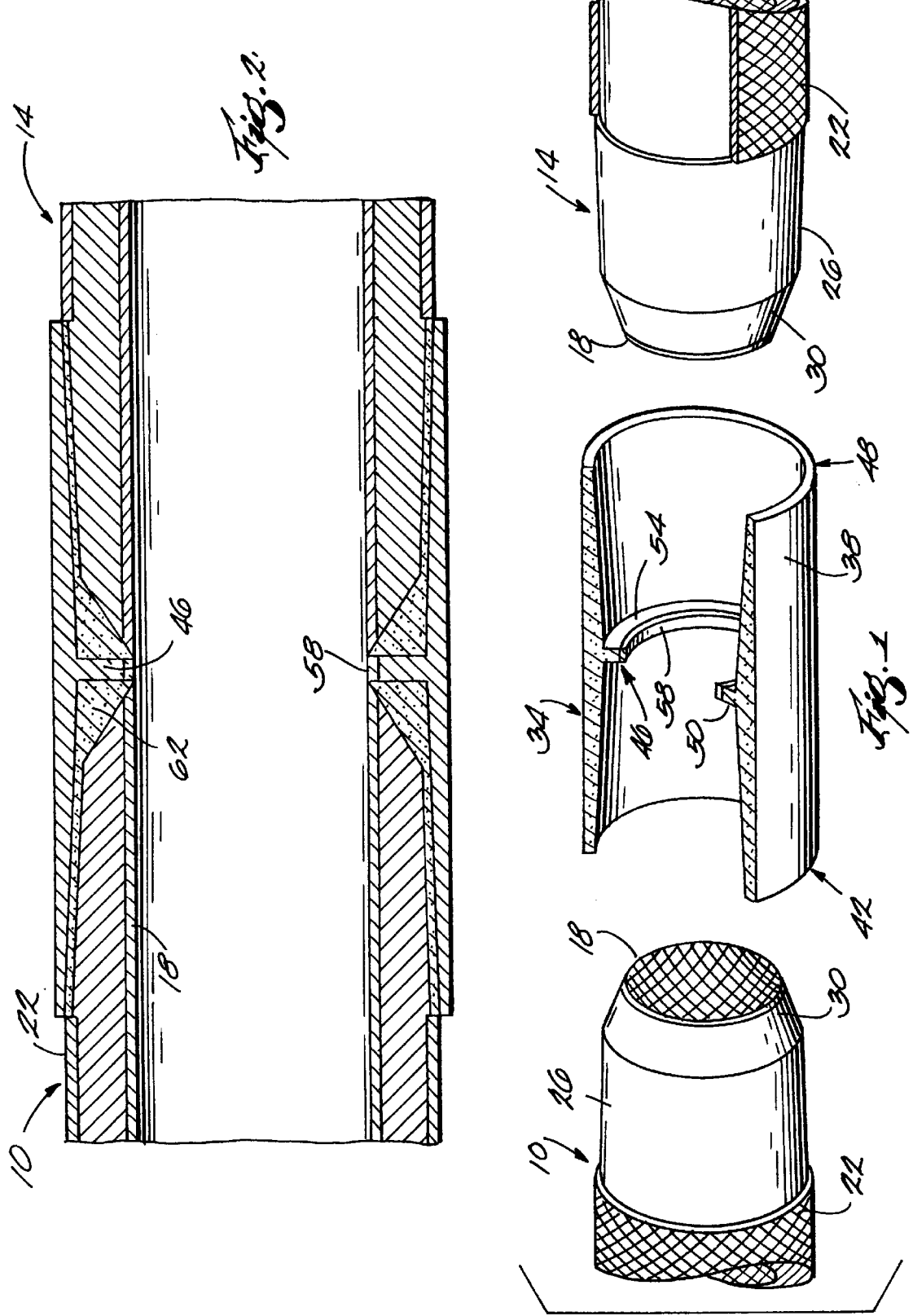

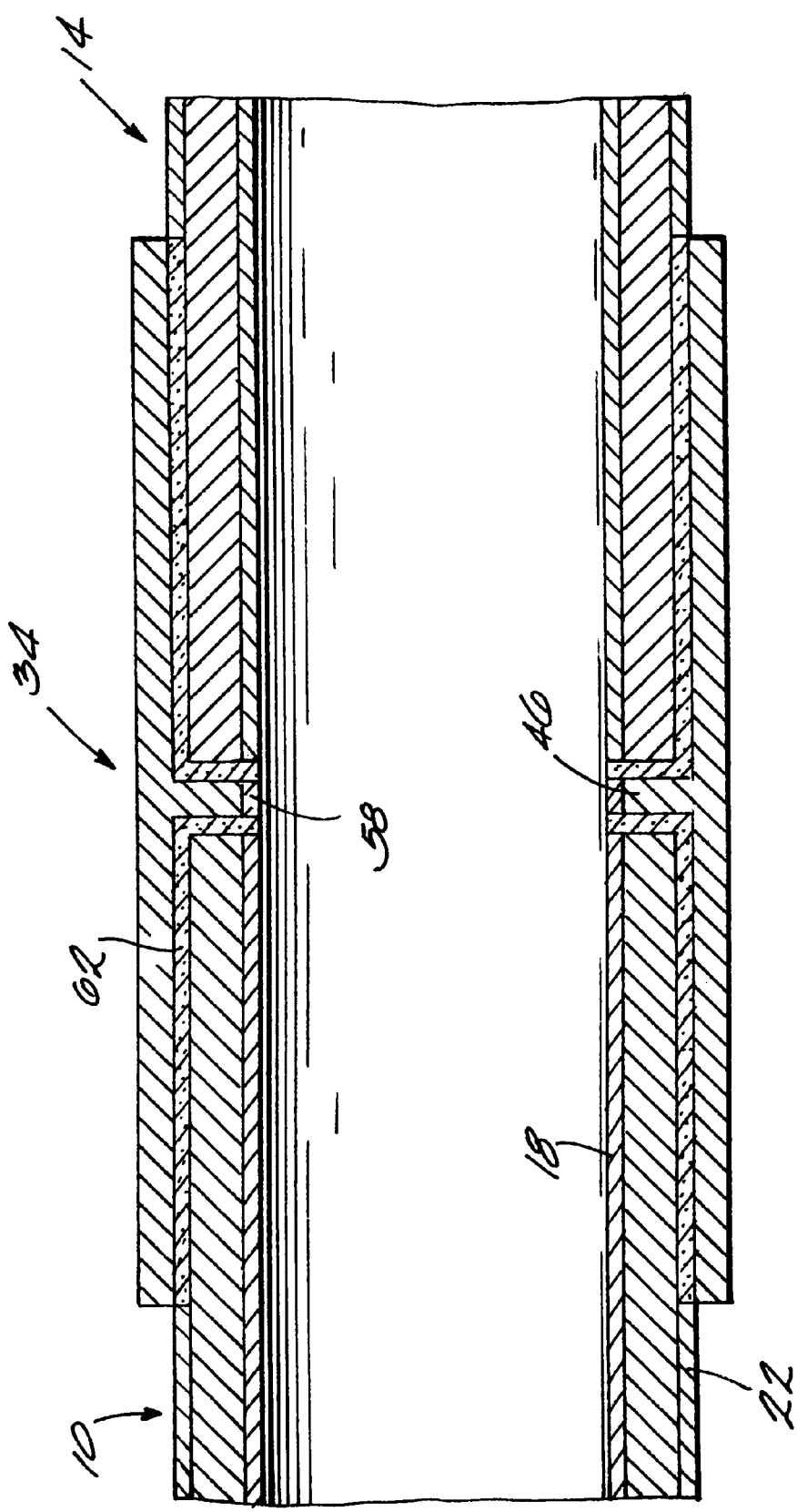

JOINING MEMBER AND METHOD OF JOINING TWO CONDUCTIVE PIECES OF FIBERGLASS REINFORCED PLASTIC PIPE

BACKGROUND OF THE INVENTION

This invention relates to conductive pipe, and, more particularly, to conductive fiberglass reinforced plastic pipe, and joining members and methods for joining the conductive pipe so as to permit electricity to flow from one piece of pipe to another piece of pipe.

SUMMARY OF THE INVENTION

This invention provides a method of joining two pieces of fiberglass reinforced pipe, the pipe having a pipe wall and including means for conducting electricity through the pipe from one end to the other end, and a joining member. The joining member includes a cylinder having a wall and including a first end adapted to receive one of the pipe pieces and a second end adapted to receive the other of the pipe pieces. The joining member also includes an inner ring integral with the cylinder wall, the ring extending radially inwardly from the cylinder wall a distance equal to about the width of the pipe wall. The inner ring also has a first side facing the first cylinder end and a second side facing the second cylinder end. The method comprises placing the one pipe piece inside the joining member first end and then the other pipe piece inside the joining member second end so a conductive adhesive is between the joining member cylinder wall, the first ring side and the second ring side and the pipe pieces so that the adhesive is between the joining member and the one pipe piece and the other pipe piece and conducts electricity from one pipe piece to the other pipe piece, and the two pieces of pipe each include an inside conductive surface and an outside conductive surface, and the conductive adhesive extends along the ring first and second sides between the inside and the outside pipe conductive surfaces and contacts the inside and the outside conductive surfaces so that static charge on the inside pipe surface can pass to the outside pipe surface.

In one embodiment, the pipe piece's inside and said outside surfaces are each formed by a conductive veil wound in the pipe pieces, and the inner ring is about midway between the first and second ends of said cylinder.

In one embodiment, the inner ring includes means for conducting electricity from the first ring side to the second ring side. The joining member is made primarily from fiberglass reinforced plastic and the conducting means comprises a conductive layer on the ring inner surface extending through said inner ring.

One of the principal objects of this invention is to provide an improved joining member and method for joining two conductive pieces of fiberglass reinforced plastic pipe. The method is accomplished by the use of a simple connecting piece which promotes transfer of static electricity within the pipes to a conductive surface on the outside of the pipes.

Other features and advantages of the invention will become apparent to those skilled in the art upon review of the following detailed description, claims and drawings.

BRIEF DESCRIPTION OF THE DRAWINGS

FIG. 1 is an exploded view with portions partially broken away of two pieces of conductive pipe and a coupling or joining member used for joining the pipe pieces in accordance with this invention.

FIG. 2 is a cross sectional view of two pieces of pipe joined together using a bell and spigot arrangement according to this invention.

FIG. 3 is a view similar to FIG. 2, however the pipes are joined together in a socket joint arrangement.

Before one embodiment of the invention is explained in detail, it is to be understood that the invention is not limited in its application to the details of the construction or the arrangements of the components set forth in the following description or illustrated in the drawings. The invention is capable of other embodiments, and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENTS OF THE INVENTION

As illustrated in FIG. 1, this invention is directed to a method of joining two conductive pieces 10 and 14, respectively, of fiberglass reinforced plastic pipe. The pipe is formed from fiberglass reinforced plastic, as is conventional in the art, however a first conductive veil 18 is wound in the interior of the pipe and a second conductive veil 22 is wound in the exterior of the pipe pieces 10 and 14. This provides a conductive surface which extends the entire length of the pipe on both the interior of the pipe and the exterior of the pipe. In the preferred embodiment, a conductive veil is used such as the one found in the product illustrated in U.S. Pat. No. 5,378,991, incorporated herein by reference.

The pipes may be connected together by either preparing the pipes for a bell joint type of connection or for a socket joint type of connection, as well as by other means. When used with a bell joint type of connection, as illustrated in FIGS. 1 and 2, the two pieces of fiberglass pipe are scarfed so as to have a taper 26 in the end of the pipe. The lead end 30 of the pipe pieces is also scarfed more severely in order to aid in aligning the pipe with a joining member 34, as described below. The joining member 34 comprises a cylinder having a wall 38 and including a first end 42 adapted to receive the pipe piece 10 and a second end 48 adapted to receive the other pipe piece 14. In the bell joint type of connection, each end 42 and 46, respectively, of the joining member 34 includes a similarly tapered portion which receives the tapered ends of the pipe pieces.

The joining member 34 further includes an inner ring 46 which is integral with the cylinder wall 38. The ring 46 extends radially inwardly from the cylinder wall 38 a distance equal to about the width of the end wall of the pipe pieces 10 and 14. The inner ring 46 has a first side 50 which faces the first cylinder end 42 and a second side 54 which faces the second cylinder end 48. In a socket joint type of connection, as illustrated in FIG. 3, there is no need to taper the ends of the pipe pieces 10 and 14. Further, the first and second ends of the joining member 34 are likewise not tapered.

The inner ring 46 further includes means 58 for conducting electricity from the first ring side 50 to the second ring side 54. In the preferred embodiment, the conducting means 58 comprises a conductive layer extending through the inner ring 46. More particularly, the inner ring 46 has an inner surface which extends across the inner ring 46 from the first ring side 50 to the second ring side 54, and the conductive layer is on the ring inner surface and is in the form of a conductive veil. In the preferred embodiment, the joining member or coupling 34 is made by winding fiberglass reinforced plastic over the conductive veil 58. The inside of the pipe is then ground back to where it can receive the two conductive pipe pieces 10 and 14. This leaves only the conductive surface created by the conductive veil on the innermost surface of the inner ring 46. This promotes the transfer of electricity from the one side of the ring 46 to the other.

The method of joining the pipe pieces includes the following steps. A conductive adhesive 62, as is conventional in the art, and as is typically constructed from a resin based corrosion resistant material made with conductive particles, is applied to the inside of the joining member cylinder wall 38. The adhesive 62 covers the first ring side 50 and the second ring side 54, and also the entire inner surface of the joining member 34. The two pipe pieces 10 and 14 are then placed within the joining member 34 and the adhesive 62 extends from one end of the joining member to the other. The pipe taper 26 and the scarfed end 30 aid in insuring contact between the adhesive 62 and the outer conductive veil 22.

The outer electrically conductive veil 22 of the first pipe piece is in electrical communication through the conductive adhesive 62 with the inner surface or veil 18 of that same piece of pipe. Likewise, on the other end of the joining member, the conductive adhesive 62 creates the same electrical connection. The two pipe pieces are in electrical communication one with the other by virtue of the presence of the conductive adhesive in contact with the pipe veils and the veil 58 on the inside surface of the ring 46. This creates a complete electrical path between the inside and the outside of the pipe pieces 10 and 14 and between the pipe pieces 10 and 14 through the electrically conductive adhesive 62 and the ring inner veil 58.

Various of the features of the invention are set forth in the following claims.

I claim:

1. A method of joining two pieces of fiberglass reinforced plastic pipe, the pipe having a pipe wall and including means for conducting electricity through the pipe from one end to the other end, and a joining member including a cylinder having a wall and including a first end adapted to receive one of said pipe pieces and a second end adapted to receive the other of said pipe pieces, and an inner ring integral with the cylinder wall, said ring extending radially inwardly from said cylinder wall a distance equal to about the width of the pipe wall and having a first side facing said first cylinder end and a second side facing said second cylinder end, the method comprising placing the one pipe piece inside the joining member first end and then the other pipe piece inside the joining member second end so a conductive adhesive is between said joining member cylinder wall, the first ring side and the second ring side and the pipe pieces so that the adhesive is between the joining member and the one pipe piece and the other pipe piece and conducts electricity from one pipe piece to the other pipe piece.

2. A method of joining two pieces of fiberglass reinforced pipe in accordance with claim 1 wherein said inner ring is about midway between the first and second ends of said cylinder.

3. A method of joining two pieces of fiberglass reinforced pipe in accordance with claim 1 wherein said inner ring includes means for conducting electricity from the first ring side to the second ring side.

4. A method of joining two pieces of fiberglass reinforced pipe in accordance with claim 3 wherein said joining member is made primarily from fiberglass reinforced plastic and wherein said conducting means comprises a conductive layer extending through said inner ring.

5. A method of joining two pieces of fiberglass reinforced pipe in accordance with claim 4 wherein the inner ring has an inner surface which extends across the inner ring from the first ring side to the second ring side, and wherein said conductive layer is on said ring inner surface.

6. The method of claim 1 wherein the pieces of pipe are joined with a bell joint type of connection or a socket joint type of connection.

7. A method of joining two pieces of fiberglass reinforced pipe, the pipe having a pipe wall and including means for conducting electricity through the pipe from one end to the other end, and a joining member including a cylinder having a wall and including a first end adapted to receive one of said pipe pieces and a second end adapted to receive the other of said pipe pieces, and an inner ring integral with the cylinder wall, said ring extending radially inwardly from said cylinder wall a distance equal to about the width of the pipe wall and having a first side facing said first cylinder end and a second side facing said second cylinder end, the method comprising placing the one pipe piece inside the joining member first end and then the other pipe piece inside the joining member second end so a conductive adhesive is between said joining member cylinder wall, the first ring side and the second ring side and the pipe pieces so that the adhesive is between the joining member and the one pipe piece and the other pipe piece and conducts electricity from one pipe piece to the other pipe piece, and said two pieces of pipe each include an inside conductive surface and an outside conductive surface, and said conductive adhesive extends along said ring first and second sides between said inside and said outside pipe conductive surfaces and contacts said inside and said outside conductive surfaces so that static charge on the inside pipe surface can pass to the outside pipe surface.

8. A method of joining two pieces of fiberglass reinforced pipe in accordance with claim 7 wherein said inside and said outside surfaces are each formed by a conductive veil wound in the pipe pieces.

9. A method of joining two pieces of fiberglass reinforced pipe in accordance with claim 7 wherein said inner ring is about midway between the first and second ends of said cylinder.

10. A method of joining two pieces of fiberglass reinforced pipe in accordance with claim 7 wherein said inner ring includes means for conducting electricity from the first ring side to the second ring side.

11. A method of joining two pieces of fiberglass reinforced pipe in accordance with claim 10 wherein said joining member is made primarily from fiberglass reinforced plastic and wherein said conducting means comprises a conductive layer extending through said inner ring.

12. A method of joining two pieces of fiberglass reinforced pipe in accordance with claim 11 wherein the inner ring has an inner surface which extends across the inner ring from the first ring side to the second ring side, and wherein said conductive layer is on said ring inner surface.

13. The method of claim 7 wherein the pieces of pipe are joined with a bell joint type of connection or a socket joint type of connection.

14. A method of joining a first and a second piece of fiberglass reinforced plastic pipe, the pipe having a pipe wall and including means for conducting electricity through the pipe from one end to the other end, the method comprising:

providing a joining member, said joining member including a cylinder having a cylinder wall, a first end adapted to receive one of said pipe pieces and a second end adapted to receive the other of said pipe pieces, and an inner ring integral with the cylinder wall, said inner ring extending radially inwardly from said cylinder wall a distance equal to about the width of the pipe wall and having a first side facing the first end of the cylinder and a second side facing the second end of the cylinder, placing the first pipe piece inside the joining member first end and placing the second pipe piece inside the joining member second end with a conductive adhesive between the joining member and the first pipe piece and between the joining member and the second pipe piece so that the adhesive extends from one pipe piece to the other pipe piece to permit electricity to be conducted between the first pipe piece and the second pipe piece.

* * * * *